Aug. 2, 1960 C. W. SIMONSEN 2,947,517
MOTOR WINCH
Filed June 23, 1958 2 Sheets-Sheet 1
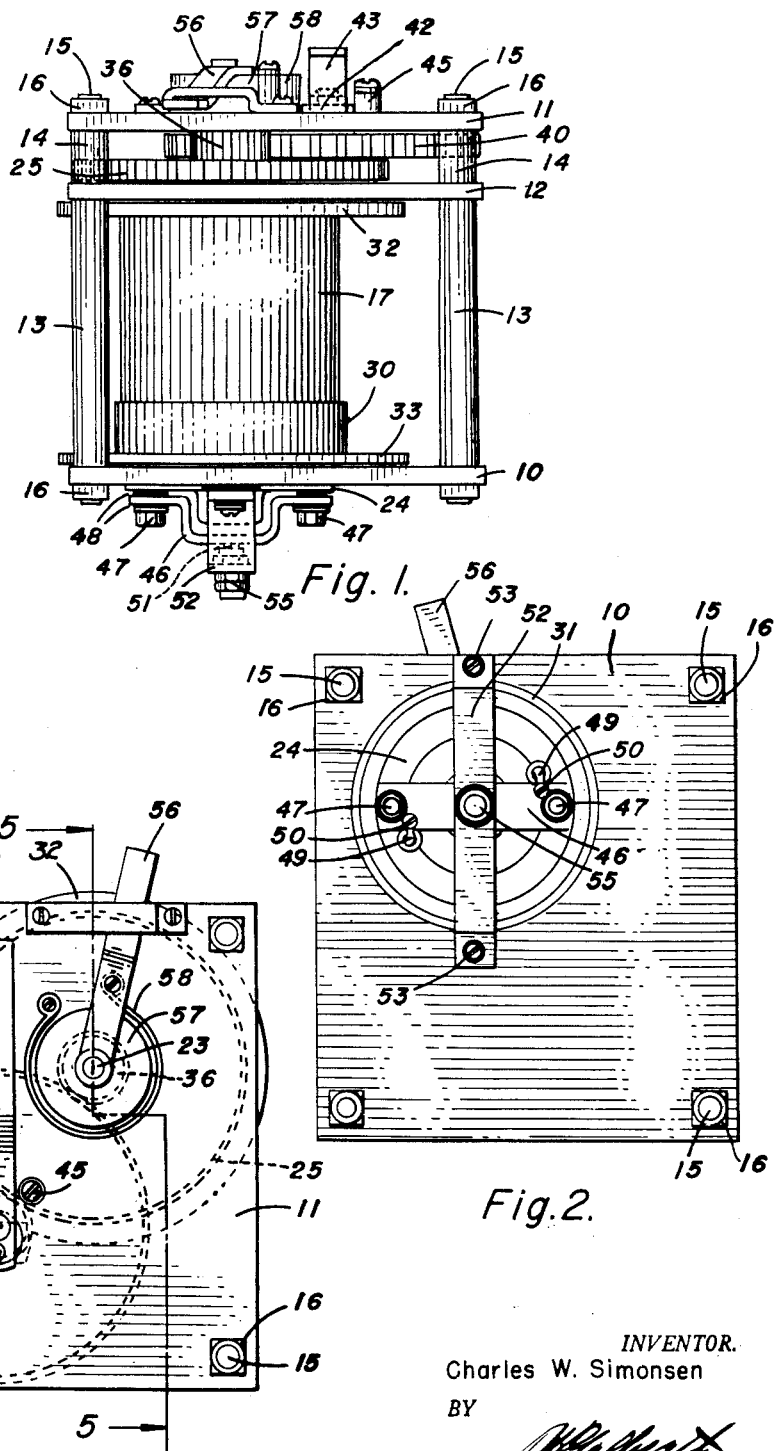
INVENTOR.
Charles W. Simonsen
BY
ATTORNEY Aug. 2, 1960  C. W. SIMONSEN  2,947,517
MOTOR WINCH
Filed June 23, 1958  2 Sheets-Sheet 2
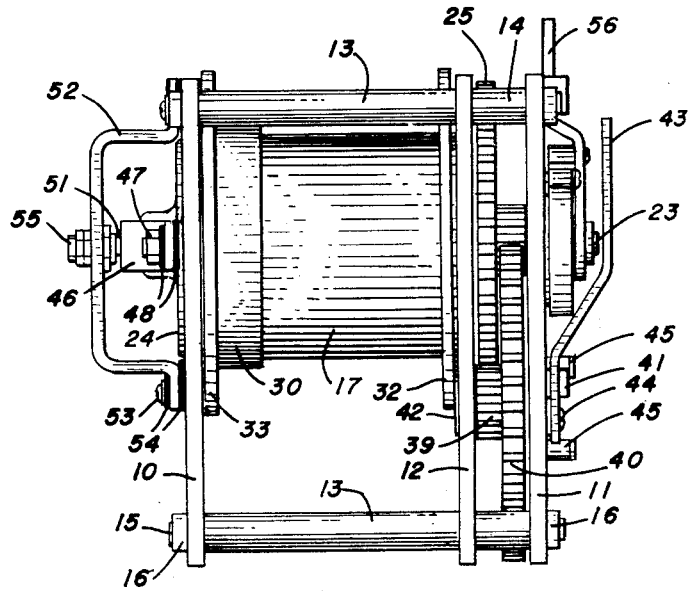
Fig. 4.
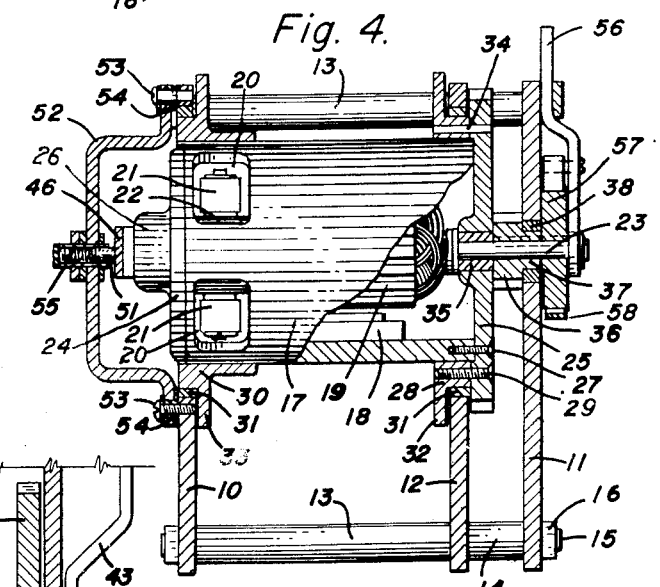
Fig. 5.
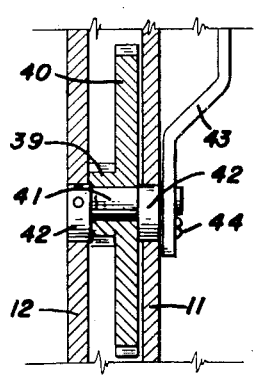
Fig. 6.
INVENTOR.
Charles W. Simonsen
BY
ATTORNEY

United States Patent Office 2,947,517
Patented Aug. 2, 1960

2,947,517

MOTOR WINCH

Charles W. Simonsen, P.O. Box 419, Longmont, Colo.

Filed June 23, 1958, Ser. No. 743,745

2 Claims. (Cl. 254—186)

This invention relates to a power operated cable reel designed for mounting on an automotive vehicle for any desired use, such as, operating wrecking and loading derricks, pulling the vehicle on inaccessible roads and so forth.

The principal object of the invention is to provide a neat, compact, electrically-operated reel which can be operated from the storage battery of the vehicle, which will occupy but a minimum of space on the vehicle, which will be readily portable, which can handle extremely heavy loads with a minimum of power consumption, and which can be easily and accurately controlled for safely lifting and lowering the load.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of the improved power-driven cable reel;

Fig. 2 is a left side elevation thereof;

Fig. 3 is a right side elevation thereof;

Fig. 4 is a front view thereof;

Fig. 5 is a vertical cross-section taken on the line 5—5, Fig. 3 with the operating motor shown partially broken away; and Fig. 6 is a fragmentary detail cross-section taken on the line 6—6, Fig. 3.

The entire reel is mounted in and supported by three rectangular steel plates, herein designated as a left side plate 10, a right side plate 11, and an intermediate plate 12. The left side plate 10 and the intermediate plate 12 are maintained in relatively wide, vertical, parallel spaced relation by means of relatively long pipe spacers 13 and the intermediate plate 12 and the right side plate 11 are maintained in relatively close, vertical, parallel spaced relation by means of relatively short pipe spacers 14. Clamping bolts 15 extend through the pipe spacers 13 and 14, as illustrated in the drawing and the bolts are provided with terminal nuts 16 which when tightened against the side plates 10 and 11 serve to clamp and hold the entire assembly in rigid rectangular relation.

The plates 10 and 12 rotatably support a cylindrical motor housing 17 of the type conventionally used as a starter motor on an automotive vehicle. The motor housing 17 encloses the usual field coils 18 and the usual armature 19 and is provided with the usual access openings 20 for allowing access to the brushes and commutator of the motor which are indicated on the drawing at 21 and 22, respectively. The armature is mounted upon an armature shaft 23.

One extremity of the armature shaft 23 is journalled in a motor end plate 24. The other extremity of the armature shaft 23 is journalled in a toothed motor end plate gear 25 which serves both as a motor end plate and as a driven gear for the reel. The end plate gear 25 is secured to the motor housing 17 in any desired manner such as by means of suitable cap screws 27 and is of larger diameter than the motor housing so that it extends radially outward beyond the latter throughout its entire circumference.

A first flanged bearing ring 28 surrounds the motor housing 17 adjacent the end plate gear 25 and is secured to the latter by means of suitable cap screws 29. A second bearing ring 30 is shrunk onto or otherwise permanently mounted on the motor housing 17 adjacent the other extremity of the motor. The second bearing ring 30 is sufficiently wide to cover the access openings 20 in the motor housing 17. The bearing rings 28 and 30 are formed with similar circular bearing surfaces which rotate in annular bronze ring bearings 31 which are fixedly mounted in the left side plate 10 and the intermediate plate 12 in axial alignment so as to rotatably support the motor housing 17.

The first bearing ring 28 is provided with a cable reel side flange 32 and the second bearing ring 30 is provided with a similar cable reel side flange 33. The side flanges 32 and 33 in combination with the cylindrical motor housing 17 form a flanged, spool-like, cable reel and these flanges also serve to prevent endwise movement of the motor housing 17 in the plates 10 and 12.

Thus, it can be seen, that the motor housing 17 is free to rotate in the plates 10 and 12 and that this housing forms the barrel of a cable reel spool upon which any suitable, flexible element such as a steel cable or chain may be wound. An anchor hole 34 is provided in the bearing ring 28, in which the extremity of the flexible element such as a cable may be secured.

One extremity of the armature shaft 23 is journalled in a conventional motor shaft bearing in a bearing cup 26 on the end plate 24. The other extremity of the armature shaft 23 is journalled in a suitable bearing 35 in the end plate gear 25 and projects to the right through and from the right side plate 11. An armature pinion 36 is keyed or otherwise fixedly mounted on the armature shaft 23 between the end plate gear 25 and the right side plate 11. The pinion 36 is provided with a cylindrical bearing portion 37 which rotates in a suitable bearing bushing 38 in the right side plate 11.

Thus, it can be seen that rotation of the motor housing 17 would rotate the end plate gear 25 and rotation of the armature shaft 23 will rotate the pinion 36 independently of each other. Rotation, however, of the housing 17 and the armature shaft 23 can be maintained at a preset ratio by means of a countershaft pinion 39 and a countershaft gear 40 which are formed or secured together as an integral unit which is rotatably mounted upon a countershaft 41. The countershaft 41 is eccentrically mounted in and between two terminal eccentrics 42 which are in turn rotatably mounted in the right side plate 11 and the intermediate plate 12, respectively.

The eccentrics 42 can be rotated in their respective plates by means of a gear shift lever 43 which fits over the extremity of the countershaft and which is fixedly secured at its lower extremity to one of the eccentrics 42 by means of a suitable cap screw 44. The spacing between the axes of the armature shaft 23 and the axis of the eccentrics 42 is such that when the shift lever 43 is in the vertical position of Fig. 3, the teeth of the countershaft pinion 39 will engage the teeth of the end plate gear 25 and the teeth of the countershaft gear 40 will engage the teeth of the armature pinion 36, and when the shift lever 43 is swung downwardly to the left, as shown in broken line in Fig. 3, the eccentricity of the axis of the countershaft 41 will cause it to swing downwardly so as to separate the countershaft pinion and the countershaft gear from the end plate gear 25 and the armature pinion 36, respectively. Suitable stop lugs 45 are provided on the right side plate 11 to limit the arc of swing of the gear shift lever 43.

The motor housing 17 is electrically grounded as is usual with automotive starter motors and the current is conducted to the live side of the motor through the medium of a conductor bar 46 which is mounted on the motor end plate 24 by means of attachment bolts 47 and which is electrically insulated from the end plate 24 by means of suitable insulation 48. Electrical motor conductors 49 extend from the motor through the motor end plate 24 and are electrically connected with the conductor bar 46, such as by means of suitable binding screws 50. The conductor bar 46 rotates in unison with the motor housing 17 and current is conducted to the rotating bar by means of an axially-positioned, spring-loaded, conductor brush 51 which is slidable within a brush tube 55 mounted in a supporting cross bar 52. The cross bar 52 is secured to and insulated from the left side plate 10 by means of suitable mounting screws 53 and suitable insulation 54, respectively.

Therefore, assuming the frame of the hoist is electrically grounded, if a live conductor from a grounded automotive battery be connected to the brush tube 55 current will be conducted to the field coils 18 and the armature 19 of the motor to cause the armature 19 to rotate forwardly at relatively high speed. This rotation will be transmitted from the armature pinion 36 to the countershaft gear 40 and from the gear 40 through the attached pinion 39 to the end plate gear 25 to rotate the entire motor housing 17 forwardly at reduced speed and increased torque, depending on the ratios of the gear train, so that the housing will act as a power-driven reel to reel a flexible element such as a cable or chain about the motor housing 17 and between the side flanges 32 and 33.

In the embodiment illustrated, the retarding action on the armature shaft 23 is applied by means of a brake band 58 which is connected at one extremity to a brake lever 56 and at its other extremity to the side plate 11 so that movement of the brake lever 56 to the left in Fig. 3 will serve to clamp band 58 around a brake drum 57 which is fixedly mounted on the armature shaft 33.

When it is desired to freely unreel a cable from the motor housing 17 without resistance, it is only necessary to swing the gear shift lever 43 downwardly to the horizontal position, which completely frees the countershaft gears from the motor gears so that the housing will rotate freely without resistance and without the necessity of rotating the armature 19.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. An electrically operated cable reel comprising: a cylindrical motor housing; motor-field coils mounted in said housing; two spaced-apart frame plates, there being one frame plate positioned adjacent each extremity of said housing and rotatably supporting the latter; an electric armature in said housing; an armature shaft driven by said armature and projecting from said housing; a gear concentrically fixed to said housing so as to rotate therewith; a motor pinion fixed to said armature shaft so as to rotate therewith; a countershaft adjacent said armature shaft; a countershaft pinion on said countershaft meshing with the gear fixed to said housing; a countershaft gear on said countershaft affixed to said countershaft pinion and meshing with said motor pinion; eccentric means for moving said countershaft to move its associated gears into and out of operative relation; means for conducting electric current to said motor-field coils and to said armature, each of the spaced-apart frame plates being provided with a relatively large opening provided interiorly with annular bronze ring bearings; and said motor housing being provided at its ends with flanged bearing rings rotatable in said bearings, said flanged bearing rings comprising cable reel side flanges to form with said motor housing in flanged spool-like cable reel, the outer sides of said flanges bearing against said side plates to prevent lateral endwise movement of said housing.

2. The structure of claim 1 wherein said motor housing is provided with access openings adjacent one end and one of said bearing rings is of a width sufficient to cover said openings, pipe spacers positioned between said plates, and clamping bolts extending through said plates and said spacers to hold said plates and housing in related assembly, said last-mentioned bearing ring being linearly removable from said housing upon disassembly of said bolts, spacers and plates to provide access to said access openings.

References Cited in the file of this patent

UNITED STATES PATENTS

| | | |
|---|---|---|
| 506,169 | Esmond | Oct. 3, 1893 |
| 785,139 | Wilhelmi | Mar. 21, 1905 |
| 866,820 | Smith | Sept. 24, 1907 |
| 983,386 | McCulloch | Feb. 7, 1911 |
| 1,060,330 | Fischer | Apr. 29, 1913 |
| 1,113,951 | Box | Oct. 20, 1914 |
| 1,585,065 | Wilsing | May 18, 1926 |
| 1,875,600 | Hele-Shaw et al. | Sept. 6, 1932 |
| 1,898,753 | Wente | Feb. 21, 1933 |